Dec. 17, 1940.  C. J. HOLSLAG  2,225,052

ARC WELDING SYSTEM

Filed March 23, 1938

INVENTOR
Claude J. Holslag
BY
A. D. T. Libby
ATTORNEY

Patented Dec. 17, 1940

2,225,052

UNITED STATES PATENT OFFICE 2,225,052

ARC WELDING SYSTEM

Claude J. Holslag, South Orange, N. J., assignor to Electric Arc Cutting & Welding Company, Newark, N. J.

Application March 23, 1938, Serial No. 197,544

9 Claims. (Cl. 219—8)

This invention relates to an alternating current arc welding system.

In my prior patents on alternating current arc welding system; for example, Reissue Patent 16,012, and Patent 1,305,363, I have shown and described certain arrangements of magnetic core parts and windings. One objection to these early types of welding transformers was the relatively high open circuit voltage, the same being 50% or more higher than the present-day accepted standard of 80. In my Patent 1,354,398, I have shown and described a relay control means separate from the transformer for reducing this open circuit voltage which is applied to the welding handle.

After many years of study of this problem and many tests, I have discovered how the transformer can be constructed so that its open circuit voltage will be way below the 80-volt standard, and, in fact, even below the working arc voltage, although I prefer to make the open circuit voltage approximately that of the arc voltage.

It is therefore one of the objects of my invention to provide means for obtaining an open circuit voltage materially lower than 80 volts which is now the accepted standard for arc welding machines in the U. S. A.

Another object of my invention is to provide an alternating current arc welding transformer which will have a much higher power factor than any heretofore designed, and a better efficiency.

Another object of my invention is to provide an alternating current arc welding system in which the arc will be much more persistent and thereby give smoother and easier operation, while at the same time producing a deeper crater in the work and a resultant better weld.

These and other objects will be clear to one skilled in this art after reading the specification taken in connection with the annexed drawing, wherein.

Figure 1:
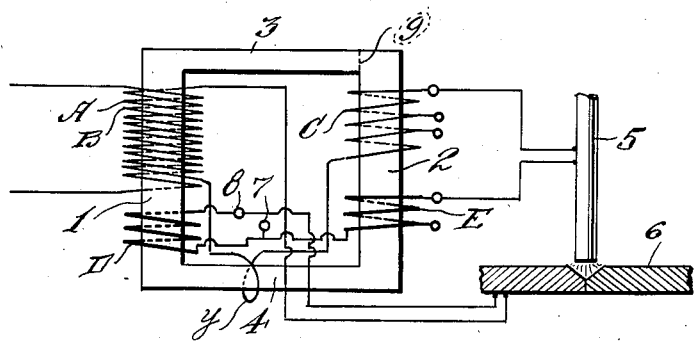
Figure 1 illustrates one form of my improved welding system.

In the different views of the drawing, wherein like numbers refer to corresponding parts, 1 and 2 are the legs of a transformer connected by yokes 3 and 4 which are, as diagrammatically shown in Figure 1, considerably smaller in cross-section than the legs 1 and 2. The yokes 3 and 4, instead of being reduced in cross-section, may be made substantially the same size as the legs 1 and 2, but of an inferior material; or a combination of smaller area and lower flux-carrying material may be used.

On the core leg 1 is positioned a primary winding A and a main secondary winding B, and while these are shown wound in intermingled relationship, they need not always be so arranged. The core leg 1 also carries a winding D which is connected in series with a winding E on the core leg 2, which leg also carries an auxiliary secondary winding C which is connected in series with the main secondary B. In some cases I prefer to use a few yoke turns Y in series with the main and auxiliary secondary windings.

The winding C is connected in opposition to the winding B, but the windings D and E are connected in additive relationship and comprise what I term a control circuit. The terminals of the windings B and C are connected across the arc electrodes 5 and 6, and the terminals of the windings D and E are likewise connected across the electrodes 5 and 6 so that the two winding circuits of the transformer are in parallel relationship across the welding electrodes. The windings may have taps, certain of which are shown in connection with the windings C and E. A tap 7 is provided between the windings D and E so that either one of these windings may be cut out for welding light work. In some cases the yokes 3 and 4 may be provided with a slight air gap as indicated by the dotted line 9.

Figure 2:
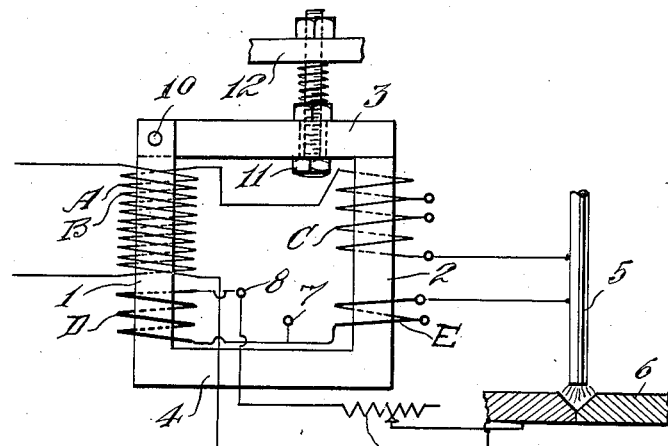
Figure 2 shows a modified form.

In Figure 2, the arrangement of the windings is the same as in Figure 1, except the yoke turns Y have been omitted, and the yoke 3 is shown as pivoted at 10 so that it can be moved by an adjusting bolt 11 carried by a fixed support member 12 to provide a flux gap between the leg 2 and the yoke 3. Furthermore, an adjusting resistance 13 is connected into the control circuit to provide an adjustment which may some times be needed.

Figure 3:
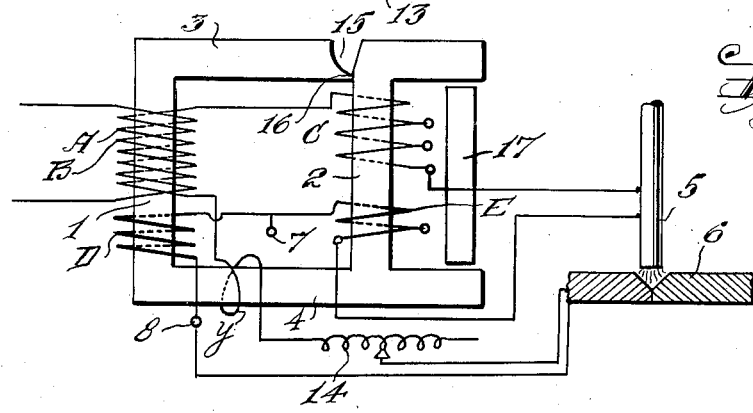
Figure 3 shows a still further modification.

In Figure 3 the windings and transformer are arranged the same as in Figure 1, but an adjusting device, which may be a resistance as in Figure 2, or in the form of an inductance 14, is connected with the main circuit, although it may be connected in the control circuit as in Figure 2. In Figure 3 the yoke 3 is cut away at 15 but still leaves a small area 16 in contact with the core leg 2. In some cases a flux diverter 17 may be used.

In arranging the windings, I will give an illustration of one combination which I have found to give excellent welding results when the source of power is 120 volts, 60 cycles. In this case, the primary turns A are 60, while the turns on the winding B are 40, and the same number of turns on the winding C, with 30 turns on the winding E and 16 on the winding D. With these proportionate turns on the various windings and with cooperating yoke arrangements, some of which have been described, I have obtained an open circuit voltage of 40 from both parallel circuits at the electrodes, which is substantially the same voltage as required by a heavily coated electrode.

Without going into a discussion of the distribution of the magnetic flux and the phase-shifting of the voltages generated in the various windings, during the period of open circuit and while welding, it seems sufficient to say that since the winding C is connected in opposition to the winding B, the two currents supplied to the electrodes 5 and 6 by the parallel circuits, are always out of phase so that the current through the arc is never at any instant at zero value, as in my earlier transformer construction as exemplified in Reissue Patent 16,012, to which further reference may be made, if necessary, for the disposition of the current and voltages during welding. Since the resultant arc current is never at zero value, the arc is much more persistant and gives a deeper penetration and thereby produces a better weld in a speedier manner than my earlier machines, or any other alternating current arc welding machine of which I have knowledge.

As far as the actual welding is concerned, one or both of the yokes 3 and 4 may be arranged with a considerable gap, or one may even be actually removed, but to get the low open circuit voltage, the yokes must provide some initial path for the flux from the leg 2 back to the core leg 1.

While I have shown a two-legged transformer of the core type and certain modifications thereof, it is to be understood that the core and windings may be arranged in other relationships without departing from the spirit of my invention or the scope of the appended claims.

What I claim is:

1. In an alternating current arc welding system comprising a transformer having means for supplying an open circuit voltage at a value materially lower than that now adopted as standard in the arc welding art, and a working voltage to suit the arc conditions, said means including a primary winding on one leg of the core, a main secondary winding on the same leg, an auxiliary secondary on another leg of the core connected in bucking relationship to the main secondary winding, the terminals of said secondary windings being connected to the arc electrodes and another circuit connected across the arc electrodes comprising two control windings connected in additive relationship, one winding being on the core leg carrying the primary and main secondary windings, while the other winding is on the leg with the auxiliary secondary winding, the windings in the two arc circuits being proportioned to deliver said voltages.

2. In an alternating current arc welding system comprising a transformer as set forth in claim 1, further characterized in that the yokes connecting said winding cores are much smaller in cross-section than the core legs carrying the windings.

3. In an alternating current arc welding system comprising a transformer as set forth in claim 1, further characterized in that the yokes connecting said winding cores are made of material having low permeability as compared with the material in the winding legs.

4. In an alternating current arc welding system comprising a transformer as set forth in claim 1, further characterized in that the yokes connecting said winding cores are made of material having low permeability as compared with the material in the winding legs and are made smaller in cross-section than the core legs carrying the windings.

5. In an alternating current arc welding system comprising a transformer for supplying the arc current, means for obtaining a relatively low open circuit voltage across the welding electrodes and a working voltage to suit the arc conditions, said means including a primary winding on one leg of the core, a main secondary winding on the same leg, an auxiliary secondary winding on another leg of the core connected in bucking relationship to the main secondary winding, the terminals of said secondary windings being connected to the arc electrodes and another circuit connected across the arc electrodes comprising two control windings connected in additive relationship, one winding being on the core leg carrying the primary and main secondary windings, while the other winding is on the leg with the auxiliary secondary winding, the transformer core legs being joined by yokes so constructed and arranged as to pass sufficient magnetic flux to insure that the proportioned windings in the two arc circuits will deliver the said voltages.

6. In an alternating current arc welding system comprising a transformer for supplying the arc current, as set forth in claim 5, further characterized in that at least one of said yokes is constructed and arranged so as to choke the flow of flux from one leg to the other when the normal arc current is flowing in the two arc circuits.

7. In an alternating current arc welding system comprising a transformer for supplying the arc current as set forth in claim 5, further characterized in that at least one of said yokes is constructed and arranged so as to choke the flow of flux from one leg to the other when the normal arc current is flowing in the two arc circuits, and means in said control crcuit for adjusting the reaction of this circuit on the other arc circuit.

8. In an alternating current arc welding system, means for obtaining a strong persistent arc, said means including a single transformer having a core and primary winding thereon and two separate power supply secondary circuits, each having parts disposed on opposite legs of the core and connected in parallel across the welding electrodes, and each delivering power current at substantially equal voltages to the arc in different phase relation.

9. In an alternating current arc welding system, means for obtaining a strong persistent arc, said means including a single transformer having a core with spaced legs, at least one primary winding on one leg of the core and two separate power supplying secondary circuits each having parts disposed on opposite legs of the core and a winding of each secondary circuit being on a leg of the core with at least a part of the primary, and connected across the welding electrodes and each delivering substantially equal power currents to the arc in different phase relation and at voltages at all times less than the value now set as standard in the arc welding art.

CLAUDE J. HOLSLAG.